Nov. 15, 1938.　　　　M. GLIWA　　　　2,137,047
EXTENSIBLE AIRPLANE WING
Filed July 26, 1937
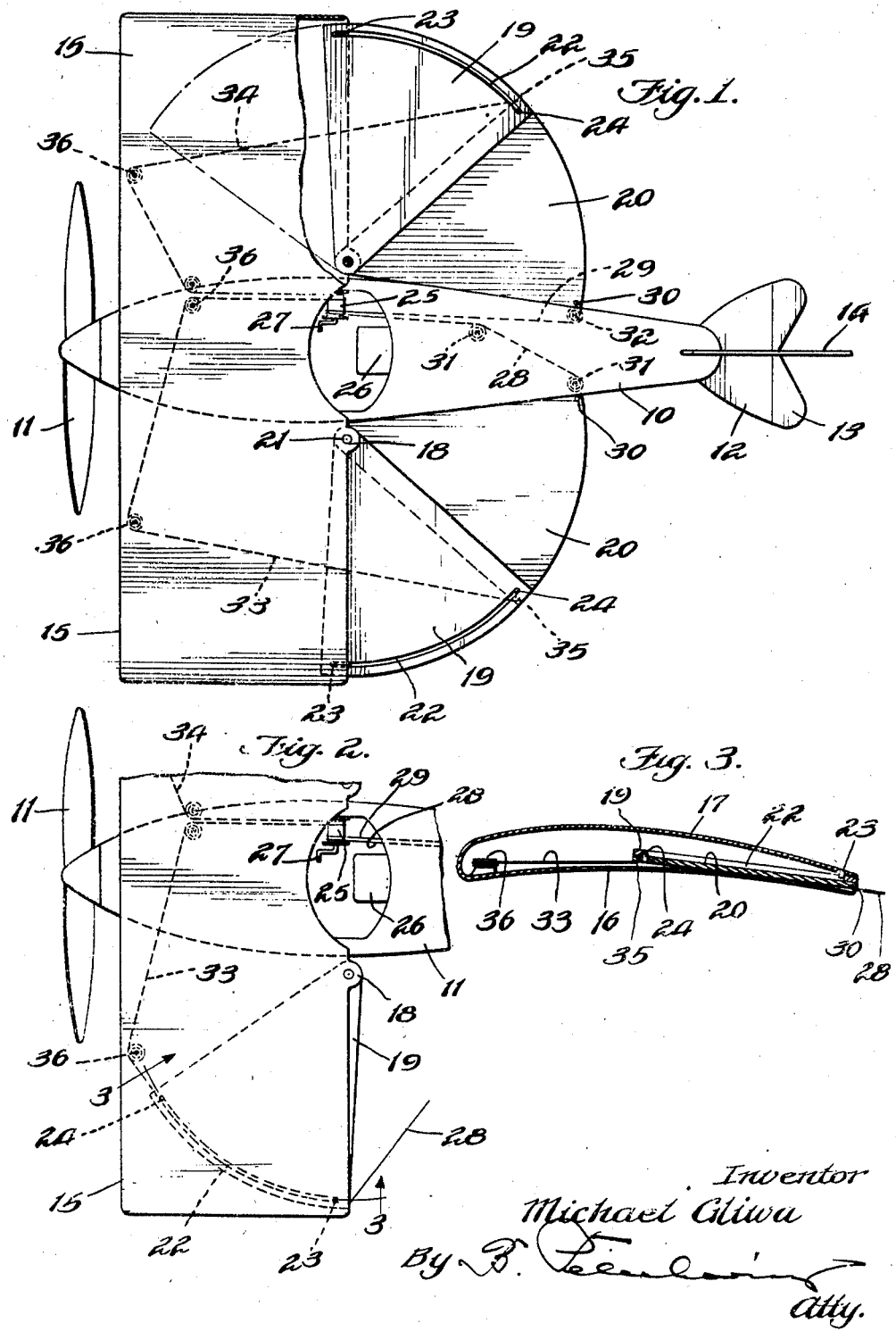
Inventor
Michael Gliwa
By
Atty.

Patented Nov. 15, 1938

2,137,047

UNITED STATES PATENT OFFICE 2,137,047

EXTENSIBLE AIRPLANE WING

Michael Gliwa, Chicago, Ill.

Application July 26, 1937, Serial No. 155,592

2 Claims. (Cl. 244—43)

The present invention relates to extensible airplane wings and has for its object the provision of auxiliary wings, preferably formed in two or more sections and which normally may be positioned within the usual airplane wings and in case of necessity the same may be extended from within the airplane wings for the purpose of increasing sustaining area of airplane wings. These auxiliary extensible wings may be extended from within airplane wings in the event of necessity or emergency so as to increase the lifting and sustaining effect of airplane for enhancing gliding capacity of the airplane.

A still further object of the present invention is the provision of auxiliary wings of the character stated, made in sections and provided with suitable mechanism for folding and extending.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views, Fig. 1 is a top plan view of the present invention showing the auxiliary wings in an operative extended position;

Fig. 2 is a fragmentary top plan view of the airplane with auxiliary wings in folded inoperative position; and Fig. 3 is a cross-sectional view through an airplane wing, the view having been taken on line 3—3 of Fig. 2.

Referring in detail to the present drawing there is shown therein an airplane including fuselage 10, propeller 11, stationary tail planes 12, elevating planes 13 and rudder 14. The airplane further includes a pair of wings 15 which are mounted in the usual manner on the forward and upper portion of the fuselage. Each of said wings 15 embodies lower and upper walls, 16 and 17, respectively, with their rearward edges unconnected to provide a recess within which the auxiliary wings hereinafter described may enter into or shift from the said wings of airplane, as is clearly seen on Fig. 3.

Said wing walls 16 and 17 of each wing 15, at a point adjacent the fuselage, are provided with rearward extensions 18 within which the auxiliary extensible wing sections are pivoted.

Each of said auxiliary extensible wings on each side of the fuselage includes an upper section 19 and a lower section 20. Each of said sections 19 and 20 is of a sector-like form. A pair of upper section 19 and lower section 20, placed one on top of the other is by its apex pivoted within extensions 18, on each side of the fuselage 10, and upon pins 21. The arc edges of said sections 19 and 20, on each side of the fuselage are disposed outwardly, as seen on Fig. 1.

Each upper section 19 at its arcuate edge is provided with an arcuate slot 22 within which pin 23, mounted upon the upper wall 17 of wing 15, extends, said pin 23 being positioned at the rearward edge of said wall 17 and adjacent the outer end of wing 15. Said pin 23 enters said slot 22 from above of section 19, and does not fully extend within said slot 22, but enters said slot substantially one-half of the thickness of section 19, for the purpose hereinafter stated.

Lower section 20 of the extensible wings is positioned below the section 19 and is provided with pin 24 which is mounted adjacent the corner formed by the arcuate edge and one straight edge of said section 20, as is clearly seen on Fig. 1. Said pin 24 likewise enters slot 22 of section 19 from below and also extends within said slot 22 to substantially one-half of the thickness of said section 19.

To fold the extensible wing sections 19 and 20 and shift them within their respective airplane wings 15 or to extend the same therefrom suitable mechanism is provided, which includes drum 25 positioned within fuselage and in front of pilot's seat 26. Said drum is operated by means of crank handle 27. To extend the auxiliary wings from within wings 15, cords 28 and 29 are provided, one end of said cords being attached to said drum 25, said cords 28 and 29 passing within the fuselage and rearwardly thereof, and their opposite ends are attached to sections 20 as at 30, a pair of pulleys 31 set within the fuselage is provided to guide cord 28, and one pulley 32 is set within fuselage 10 to guide cord 29.

To fold the extensible wing sections 19 and 20 on each side of the fuselage, a pair of cords 33 and 34 is provided. By one of their ends said cords 33 and 34 are likewise attached to drum 25 and the opposite ends of said cords are attached to sections 20 at points opposite from those to which cords 28 and 29 attach, as at 35. For guiding each of said cords 33 and 34 a pair of pulleys 36, set within wings 15 is provided when said sections 19 and 20 are extended as shown on Fig. 1. Cords 33 and 34 pass and are disposed below sections 19.

When drum 25 is rotated into one direction cords 28 and 29 will be wound therearound, and simultaneously cords 33 and 34 will become unwound, permitting extension of sections 19 and 20 from within wings 15, until the adjacent side edge of sections 20 contacts with the fuselage. When said drum is rotated into an opposite direction cords 33 and 34 will be wound around said drum 25 and simultaneously cords 28 and 29 will become unwound, for the purpose of folding sections 19 and 20 one upon the other and shifting the same within the respective wings 15.

When sections 19 and 20 remain inwardly of wings 15, pin 24 contacts with the most outwardly positioned point defined by slot 22, while pin 23 remains at the opposite point of said slot 22 as clearly seen on Fig. 3. When drum 25 is rotated for the purpose of extending auxiliary wing sections 19 and 20, during the process of shifting of said sections 19 and 20 from within wings 15, pin 24 will pass pin 23, there being mutual clearance for said pins by virtue of the fact that said pins extend only to one-half of the thickness of sections 19 so that when said sections 19 and 20 are fully extended as shown on Fig. 1, pin 24 will find itself at the end of slot 22 wherein formerly during the inoperative position of said sections, pin 23 found a rest, and pin 23 will be located at the opposite end of slot 22 where formerly, during the inoperative position of sections, pin 24 rested.

Pins 23 and 24 also constitute a means whereby further extensible or folding shifting movement of sections 19 and 20 is limited. When said pins 23 and 24 will both hit the respective ends of slot 22 said sections 19 and 20 cannot be further shifted, and this holds true whether said sections 19 and 20 are extended or shifted to their inoperative folded position within wings 15.

If preferable drum 25 may be provided with a pawl and ratchet mechanism whereby said drum 25 may be held in a stationary adjusted position for preventing further shifting of sections 19 and 20 when the same remain either in an operative or inoperative position. Sections 19 and 20 may be made of light metal or they may also be constructed of wooden veneer board.

From the hereinabove description it will be seen that extension of sections 19 and 20 may be had at a moment's notice, and when said sections 19 and 20 are fully extended the sustaining area for the airplane is vastly increased for proportionately enhancing gliding and sustaining qualities of the machine.

While there is described herein a preferred embodiment of the present invention, it is nevertheless to be understood that minor changes may be made therein without departing from the spirit and scope of the invention as claimed.

What I claim as new is:

1. In an airplane, the combination, of an elongated fuselage having fixed wings extending laterally from the forward portion thereof, said wings being hollow and open along their rear edges, an extensible and collapsible auxiliary wing carried by each of said fixed wings and movable out of and into the latter through its open rear edge, each auxiliary wing comprising relatively movable superimposed sector-shaped plate-like sections pivoted at their apices upon a common vertical pivot within the associated fixed wing adjacent the juncture of the rear edge of the latter with the fuselage and adapted to extend from the fixed wing to the fuselage in contact with the adjacent side of the latter when extended, and manually operable means to simultaneously extend or simultaneously collapse said auxiliary wings.

2. In an airplane, the combination of an elongated fuselage having fixed wings extending laterally from the forward portion thereof, said wings being hollow and open along their rear edges, an extensible and collapsible auxiliary wing carried by each of said fixed wings and movable out of and into the latter through its open rear edge, each auxiliary wing comprising relatively movable superimposed sector-shaped plate-like sections pivoted at their apices upon a common vertical pivot within the associated fixed wing adjacent the juncture of the rear edge of the latter with the fuselage and adapted to extend from the fixed wing to the fuselage in contact with the adjacent side of the latter when extended, manually operable means to simultaneously extend or simultaneously collapse said auxiliary wings, the upper section of each auxiliary wing having an arcuate slot therein along its outer arcuate edge, a pin depending from the top wall of the associated fixed wing and entering said slot, a second pin projecting upwardly from the lower plate section of said auxiliary wing and entering said slot, said pins being movable past each other in said slot when the auxiliary wing is extended or collapsed.

MICHAEL GLIWA.